United States Patent [19]

Kreft

[11] 4,287,765
[45] Sep. 8, 1981

[54] ACCELEROMETER AND EVALUATION CIRCUIT

[75] Inventor: Wolfgang Kreft, Wolfsburg, Fed. Rep. of Germany

[73] Assignee: Volkswagenwerk Aktiengesellschaft, Wolfsburg, Fed. Rep. of Germany

[21] Appl. No.: 133,471

[22] Filed: Mar. 24, 1980

[30] Foreign Application Priority Data

May 18, 1979 [DE] Fed. Rep. of Germany ....... 2920147

[51] Int. Cl.³ .................... G01P 15/08; B60R 21/08
[52] U.S. Cl. .................................. 73/517 R; 307/121; 340/52 H
[58] Field of Search ............ 73/516 R, 517 R, 517 B, 73/492, 514; 180/282; 280/728, 734, 735; 340/52 H; 307/9, 10 R, 121

[56] References Cited

U.S. PATENT DOCUMENTS

| | | | |
|---|---|---|---|
| 3,739,191 | 6/1973 | Nagazumi | 307/121 |
| 3,911,391 | 10/1975 | Held et al. | 340/52 H |
| 4,084,443 | 4/1978 | Walter | 73/517 R |
| 4,108,006 | 8/1978 | Walter | 73/517 R |

*Primary Examiner*—James J. Gill

*Attorney, Agent, or Firm*—Brumbaugh, Graves, Donohue & Raymond

[57] ABSTRACT

The combination of an accelerometer and an evaluation circuit are disclosed for controlling a safety device in an automobile. The accelerometer includes a pair of electromagnetic circuits having a sensor coil and arranged at an angle other than 180° relative to each other. A movable member is positioned within the angle and is deflected upon acceleration, due to inertia, to induce electrical voltages in the coils. The magnitude of the induced voltages are a function of the direction of acceleration. The evaluation circuit includes a directional discriminator connected to the coils to generate a signal to actuate the safety device in response to a voltage with a predetermined polarity occurring in at least one of the sensor coils, when the other voltage is zero or of the same polarity. The angle between the electromagnetic circuits is chosen to generate the first signal only in response to accelerations occurring within a desired directional sector. An acceleration level discriminator and an integrator, for generating signals representative of the speed change of the accelerometer, may also provide control signals.

5 Claims, 1 Drawing Figure

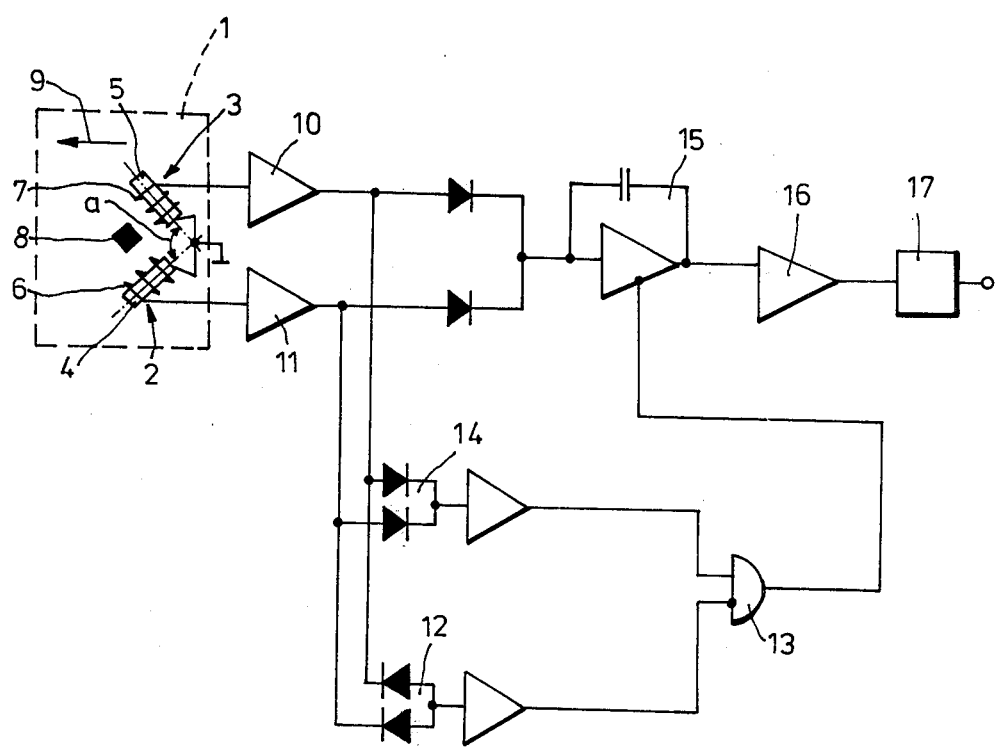

ACCELEROMETER AND EVALUATION CIRCUIT

BACKGROUND OF THE INVENTION

The invention relates to the combination of an accelerometer and an evaluation circuit connected thereto for controlling a safety device in an automobile.

Accelerometers, or electrodynamic acceleration sensors, are known; see, for example, U.S. Pat. No. 4,108,006 to Walter. Presently, accelerometers are used for the actuation of safety devices, for example, air bags in automobiles. Actuation of the safety device should be controlled so that actuation takes place not only upon the occurrence of an acceleration of given magnitude, either positive or negative as desired, but also when such acceleration takes place in a given direction, that is, within a prescribed directional sector. For example, actuation of an air bag is undesirable when a lateral impact occurs in an automobile. In addition, actuation should not occur when the automobile is hit from the rear.

An advantage of an accelerometer of the type disclosed in the Walter patent is the fact that the direction of the acceleration, as well as its magnitude, can be determined using a singular accelerometer. Accordingly, where it is desired to control a safety device upon impact not only of a given magnitude, but only from certain directions, the installation of a plurality of accelerometers and a combined electrical circuit to generate output signals is not required.

SUMMARY OF THE INVENTION

The present invention is an improved accelerometer and evaluation circuit for controlling a safety device in an automobile which is both magnitude and direction sensitive, yet is simple in construction, can be constructed using known components, and is reliable. At the same time, the arrangement generates an actuation signal for the safety device only if a predetermined amplitude of acceleration occurs and such acceleration occurs within a specified angular sector, e.g. in automobiles, upon impact from the front, but not the side or rear.

More particularly, in the present invention the accelerometer includes a pair of electromagnetic circuits arranged at an angle other than 180° relative to each other. Each electromagnetic circuit has a sensor coil. A movable member is positioned within the angle formed by the sensor coils and arranged to be deflectable due to inertia through the acceleration forces applied to the accelerometer. Upon deflection, the movable member induces electrical voltages in the individual electromagnetic circuits of a magnitude which is a function of the direction of acceleration. The control circuit includes a directional discriminator connecated to each of the sensor coils which generates a first signal to actuate the safety device where a voltage occurs in either of the sensor coils of a predetermined polarity, as long as the other voltage is zero or of the same polarity. The relative angle of the electromagnetic circuits is chosen for generating a first signal to actuate the safety device only in response to acceleration occurring within a desired directional sector. The directional discriminator may be an OR gate which is blocked if the voltage in either of the sensors is opposite to the desired polarity.

The evaluation circuit may also include an acceleration level discriminator, which may be an OR gate, which is connected to the sensor coils to generate a second signal in response to a voltage in either of the sensors, or the combined voltages, exceeding a threshold value. The directional discriminator and acceleration level discriminator signals are provided to an AND gate, which delivers the third signal upon the simultaneous presence of both the first and second signals in both discriminators. The third signal from the AND gate is used to actuate an integrator. The integrator is connected to the sensor coils for generating an output corresponding to speed change. When released by the signal from the AND gate, the output of the integrator, reprsentative of the speed difference, is directed to a circuit component which actuates the safety device in response to achieving a predetermined threshold value.

For a better understanding of the invention, reference is made to the following detailed description of the preferred embodiment of the invention, taken in conjunction with the drawings accompanying the application.

BRIEF DESCRIPTION OF THE DRAWING

The drawing represents a schematic illustration of an accelerometer and accompanying evaluation circuit in accordance with the invention.

DETAILED DESCRIPTION OF THE PREFERRED EMBODIMENT

An accelerometer 1 contains two electromagnetic circuits 2 and 3 each having a core 4 and 5 as well as sensor windings 6 and 7. A movable member 8, which is made up of a magnetically active mass and magnetically coupled to cores 4 and 5, is arranged such that when accelerations occur, it undergoes a deflection due to its inertia within the horizontal angle "a" formed by the axis of the two electromagnetic circuits 2 and 3. The relative positioning of the circuits 2 and 3, and thus the angle "a", is chosen by the desired directional sector corresponding to the acceleration vectors within which is desired to obtain an activation signal for the safety device, the latter being itself known and therefore not shown in the FIGURE. In the FIGURE, the direction of forward travel of the vehicle is indicated by the arrow 9. An impact precisely in the direction opposite to the arrow 9 results in the deflection of the member 8 away from both electromagnetic circuits 2 and 3 so that in both sensor coils 6 and 7 positive voltages are induced (or negative if desired).

However, if impact occurs slightly from the side, for example, parallel to the axis of one of the electromagnetic circuits, the member 8 moves parallel to the one axis such that in the associated sensor coil no voltage would be induced. Assuming by way of example that impact occurs at an angle parallel to the axis of the circuit 3, no voltage would be induced in the circuit 3 since the mass 8 moves merely parallel to the axis of the circuit 3. However, since the member 8 moves away from the circuit 2, a positive voltage would still be induced in the sensor coil 6 of the other magnetic circuit 2. Thus, if the direction of impact occurs within the angular sector "a", a positive voltage would be induced in both coils 6 and 7. If impact occurs along the outer limits of the sector "a", either along the axis of the circuit 2 or the axis of the circuit 3, zero voltage would be induced in one circuit and a positive voltage would be induced in the other circuit. Outside of the angle "a", a negative voltage would be induced in at least one of the two circuits 2 or 3.

The generation of voltages of a polarity depending upon the angle of impact is utilized in the present invention to obtain a directional criteria for the positive or negative accelerations that occur. The voltages in both sensor coils 6 and 7 are delivered by way of amplifiers 10 and 11 to a directional discriminator 12, having a successive threshold value amplifier. The directional discriminator 12, by way of example, constitutes an OR gate which delivers a first signal to one of the two inputs of AND gate 13 only if, upon impact, a positive voltage or zero voltage is induced in both sensor coils 6 and 7. If a different direction of acceleration occurs and one of the voltages of the sensor coil is negative, the negative signal, which is transmitted to the OR gate 12, blocks the signal to the threshold value amplifier, so that the amplifier, in turn, does not forward a first signal to the AND gate 13.

In order to assure that accelerations occurring during normal operation of the vehicle do not accidentally cause an activation of the safety device, an acceleration level detector 14 is connected to the sensor coils 6 and 7. The acceleration level detector 14 may be an OR element which transmits positive voltages from the coils 6 and 7 to a threshold value amplifier connected to the output. The OR gate 14 and threshold value amplifier cause a second signal to be delivered to the second input of the AND element 13 if a positive voltage exceeding a predetermined threshold value occurs in either or both of the sensor coils 6 and 7, or if the combined voltages, where both are positive and thus added by the OR gates, exceed the threhold.

When both the first and second signals occur simultaneously, the AND gate 13 transmits a third signal to an integrator 15 releasing the integrator. The integrator 15 is connected by way of a diode circuit to both sensor coils 6 and 7. A circuit component 16 is connected to the output of the integrator 15. The component may be a threshold switch, in itself known, forming a threshold value for the speed difference, which output is supplied by the integrator 15. Thus, only if, in addition to the actuation of the AND gates 13, the speed difference occurring during a critical acceleration exceeds a defined threshold value, a signal is delivered to the signal generating component 17 which then causes an actuation of the safety device.

The accelerometer and control circuit in accordance with the present invention is simple in construction and can be formed with components which are readily available on the market. Due to the correspondence between the relative angular positioning of the two electromagnetic circuits 2 and 3 and the desired directional sector for acceleration vectors where it is desirable to actuate the safety device, the use of the sign change of the voltage in the sensor coils 5 and 6 of the two circuits 2 and 3 may be used as criterion for an indication that the direction of impact is outside of the desired directional sector.

The invention has been shown and described with reference to certain preferred embodiments thereof. Variations and modifications of the invention will be apparent to persons skilled in the art without departing from the inventive concepts disclosed herein. All such variations and modifications are intended to be within the scope of the present invention as defined in the following claims.

I claim:

1. The combination of an accelerometer and an evaluation circuit connected thereto for controlling a safety device in an automobile, wherein said accelerometer comprises:

a pair of electromagnetic circuits arranged at an angle other than 180° relative to each other and each having a sensor coil;

a movable member, arranged to be inertially deflectable by acceleration forces applied to said accelerometer, and including means for inducing electrical voltages in the individual electromagnetic circuits, said voltages having a magnitude which is a function of the amplitude and direction of acceleration, wherein said evaluation circuit comprises directional discriminator means connected to each of said sensor coils for generating a first signal for actuating the safety device in response to a voltage with predetermined polarity occurring in at least one of said sensor coils, where the voltage in the other of said sensor coils is zero or has said predetermined polarity, and wherein said angle is chosen for generation of said first signal for actuating the safety device only in response to accelerations occurring within a desired directional sector.

2. The combination as defined in claim 1, wherein said directional discriminator means comprises an OR gate for generating said first signal, wherein said first signal is blocked when the voltage in at least one of said sensors is opposite to said predetermined polarity.

3. The combination as defined in claim 1 or 2, wherein said evaluation circuit comprises means for combining said sensor voltages having said predetermined polarity to form a combined voltage, acceleration level discriminator means for generating a second signal in response to said combined voltage exceeding said threshold value, and an AND gate having a pair of inputs connected to said directional discriminator means and said acceleration level discriminator means for receiving said first and second signals, respectively.

4. The combination as defined in claim 3, wherein said acceleration level discriminator means comprises an OR gate.

5. The combination as defined in claim 3, wherein said evaluation circuit comprises integrator means connected to said sensor coils for generating an output corresponding to speed, circuit component means connected to said integrator means for actuating the safety device in response to said output exceeding a predetermined threshold, and wherein said AND gate is connected to said integrator means to deliver a third signal for actuating said integrator means upon the simultaneous presence of said first and second signals.

* * * * *